US010235424B2

(12) United States Patent
Becker et al.

(10) Patent No.: US 10,235,424 B2
(45) Date of Patent: Mar. 19, 2019

(54) SYSTEMS AND METHODS FOR COLOR PALETTE SUGGESTIONS

(71) Applicant: Shutterstock, Inc., New York, NY (US)

(72) Inventors: Chris Becker, New York, NY (US); David Kroner, Brooklyn, NY (US); Steve Blaurock, Queens, NY (US)

(73) Assignee: SHUTTERSTOCK, INC., New York, NY (US)

( * ) Notice: Subject to any disclaimer, the term of this patent is extended or adjusted under 35 U.S.C. 154(b) by 567 days.

(21) Appl. No.: 14/701,547

(22) Filed: May 1, 2015

(65) Prior Publication Data
US 2015/0324366 A1   Nov. 12, 2015

Related U.S. Application Data

(60) Provisional application No. 61/988,962, filed on May 6, 2014.

(51) Int. Cl.
*G06F 17/30* (2006.01)
(52) U.S. Cl.
CPC ...... *G06F 17/3053* (2013.01); *G06F 17/3025* (2013.01); *G06F 17/30268* (2013.01); *G06F 17/30554* (2013.01); *G06F 17/30616* (2013.01)

(58) Field of Classification Search
CPC ........... G06F 17/3025; G06F 17/30268; G06F 17/3053; G06F 17/30554; G06F 17/30616
See application file for complete search history.

(56) References Cited

U.S. PATENT DOCUMENTS 5,086,295 A   2/1992   Boettcher et al.
5,299,116 A   3/1994   Owens et al.
(Continued)

FOREIGN PATENT DOCUMENTS

WO   WO 2014070168   5/2014
WO   WO2014070914   5/2014

OTHER PUBLICATIONS

Flickner et al., "Query by image and video content: The QBIC system," Computer, 28(9) pp. 23-32, 1995.
(Continued)

*Primary Examiner* — Dinku W Gebresenbet
(74) *Attorney, Agent, or Firm* — McDermott Will & Emery LLP

(57) ABSTRACT

A method and system for conducting image search is provided that includes searching a first database to locate a set of pertinent images, iteratively performing the following operations for each image in the set of pertinent images (a) extracting the histogram of red green and blue colors (RGB colors) from a given image (b) distilling the extracted RGB colors down to create a reduced color palette for the given image (c) segmenting the extracted RGB colors into a set of segments representing distinct parts of the color spectrum; (d) selecting a subset of segments to assemble a color palette for the given image; (e) updating the assembled color palette and the customer behavior score for the given image in the first database; and generating a ranked display of suggested color palettes for the search query by aggregating the customer behavior scores for the search query across all images.

18 Claims, 10 Drawing Sheets
(9 of 10 Drawing Sheet(s) Filed in Color)

(56) References Cited

U.S. PATENT DOCUMENTS

| | | |
|---|---|---|
| 5,307,182 A | 4/1994 | Maltz |
| 5,313,231 A | 5/1994 | Yin et al. |
| 5,434,957 A | 7/1995 | Moller |
| 6,185,385 B1 | 2/2001 | Mestha et al. |
| 6,385,336 B1 | 5/2002 | Jin |
| 6,518,981 B2 | 2/2003 | Zhao |
| 6,859,210 B2 | 2/2005 | Luo |
| 7,023,577 B2 | 4/2006 | Watanabe |
| 7,126,612 B2 | 10/2006 | Sekiguchi |
| 7,715,624 B2 | 5/2010 | Nishida |
| 7,864,999 B2 | 1/2011 | Chang et al. |
| 7,873,521 B2 | 1/2011 | Kurozumi et al. |
| 8,502,864 B1 | 8/2013 | Watkins |
| 8,508,547 B2 | 8/2013 | Klassen |
| 8,576,241 B1 | 11/2013 | Kanter et al. |
| 8,587,604 B1 | 11/2013 | Kanter et al. |
| 8,593,478 B2 | 11/2013 | O'Brien-Strain |
| 8,630,485 B2 | 1/2014 | Cok |
| 8,634,640 B2 | 1/2014 | Bhatti |
| 8,890,884 B2 | 11/2014 | Zhang |
| 9,002,100 B2 | 4/2015 | Lecerf |
| 9,390,168 B1 | 7/2016 | Dykstra et al. |
| 9,582,517 B2 | 2/2017 | Chester et al. |
| 9,792,303 B2 | 10/2017 | Sayre, III et al. |
| 2001/0003814 A1 | 6/2001 | Hirayama et al. |
| 2002/0080153 A1 | 6/2002 | Zhao et al. |
| 2002/0094124 A1 | 7/2002 | Kim |
| 2005/0055344 A1 | 3/2005 | Liu et al. |
| 2006/0193538 A1 | 8/2006 | Vronay et al. |
| 2006/0195325 A1 | 8/2006 | Tateson et al. |
| 2006/0218522 A1 | 9/2006 | Hanechak |
| 2006/0248081 A1 | 11/2006 | Lamy |
| 2007/0188445 A1 | 8/2007 | Silverstein et al. |
| 2007/0188478 A1 | 8/2007 | Silverstein et al. |
| 2008/0046409 A1 | 2/2008 | Lieb |
| 2008/0046410 A1 | 2/2008 | Lieb |
| 2009/0003892 A1 | 1/2009 | Sakaizawa et al. |
| 2009/0041345 A1* | 2/2009 | Tirumalareddy ... G06F 17/3025 382/165 |
| 2009/0252404 A1 | 10/2009 | Lecerf |
| 2009/0281925 A1 | 11/2009 | Winter et al. |
| 2010/0158412 A1 | 6/2010 | Wang et al. |
| 2011/0085697 A1 | 4/2011 | Clippard et al. |
| 2011/0135195 A1* | 6/2011 | Marchesotti ......... G06K 9/4652 382/165 |
| 2011/0184950 A1 | 7/2011 | Skaff et al. |
| 2011/0191334 A1 | 8/2011 | Hua et al. |
| 2011/0289082 A1 | 11/2011 | Townsend |
| 2011/0313927 A1 | 12/2011 | Savilia et al. |
| 2012/0045121 A1 | 2/2012 | Youngman et al. |
| 2012/0075329 A1 | 3/2012 | Skaff et al. |
| 2012/0099784 A1 | 4/2012 | Marchesotti et al. |
| 2012/0163710 A1 | 6/2012 | Skaff et al. |
| 2012/0166472 A1 | 6/2012 | Hoppenot et al. |
| 2012/0189340 A1 | 7/2012 | Hagiwara |
| 2012/0224764 A1 | 9/2012 | Weng |
| 2012/0239506 A1 | 9/2012 | Saunders et al. |
| 2012/0254790 A1 | 10/2012 | Colombino et al. |
| 2013/0073336 A1 | 3/2013 | Heath |
| 2014/0019484 A1 | 1/2014 | Coppin et al. |
| 2014/0055484 A1 | 2/2014 | Moon |
| 2014/0089295 A1 | 3/2014 | Becherer et al. |
| 2014/0096009 A1 | 4/2014 | Grosz et al. |
| 2014/0201634 A1 | 7/2014 | Hill |
| 2014/0270498 A1 | 9/2014 | Chester et al. |
| 2014/0304661 A1 | 10/2014 | Topakas et al. |
| 2014/0334722 A1 | 11/2014 | Bloore et al. |
| 2015/0039994 A1 | 2/2015 | Hoguet |
| 2015/0046254 A1 | 2/2015 | Raab et al. |
| 2015/0081469 A1 | 3/2015 | Acharyya et al. |
| 2015/0110381 A1 | 4/2015 | Parvin et al. |
| 2015/0170380 A1* | 6/2015 | Duwenhorst ......... G06T 11/001 345/594 |
| 2015/0199010 A1 | 7/2015 | Coleman et al. |
| 2015/0220578 A1 | 8/2015 | Hunt et al. |
| 2015/0310010 A1 | 10/2015 | Brenner et al. |
| 2015/0324365 A1 | 11/2015 | Becker et al. |
| 2015/0324392 A1 | 11/2015 | Becker et al. |
| 2015/0324394 A1 | 11/2015 | Becker et al. |
| 2015/0378999 A1 | 12/2015 | Dorner et al. |
| 2015/0379004 A1 | 12/2015 | Sayre, III et al. |

OTHER PUBLICATIONS

Smith et al., "VisualSEEk: a fully automated content-based image query system," In Proceedings of the fourth ACM International Conference on Multimedia, pp. 87-89, ACM, 1997.

* cited by examiner 610  620  630  640   FIGURE 6 n: number of colors in the image
D: distance between two colors in the LCH color space (a number between 0 and ~300)
P: percentage of the image covered by the given color (a number between 0 and 100)
W: weight for a given color
x: the specific color being assigned a weight $$W[x] = P[x] \times \prod_{i=1}^{n} \begin{cases} D[x,i] <= 40 & 1 + 100 \times ((P[i]/100) \times (D[x,i]/300)) \\ \\ D[x,i] > 40 & 1 - 100 \times ((P[i]/100) \times (D[x,i]/300)) \end{cases}$$

FIGURE 10

SYSTEMS AND METHODS FOR COLOR PALETTE SUGGESTIONS

BACKGROUND

1. Field of Disclosure

The present disclosure generally relates to a color palette suggestion system, and, more particularly, to systems and methods for conducting a keyword, a color and a trend based image search in response to a user presenting a search query.

2. Background of the Invention

Searching pertinent images over the Internet can be a particularly challenging task for artists and designers. The commercial systems may require an artist to select a single image from a pool of millions of images that may be retrieved for a keyword search query. In marketing, the precise image selection for a product may directly be linked with the commercial success of a product. An artist may be required to conduct a complex search query to perform an image search based on a keyword and a color. In that case, artists may have to create and discover color palettes to meet their business needs or aesthetic tastes. When an artist is searching for the keyword "ocean," the Internet search engine may return a large number of images associated with the keyword ocean in various colors and shades.

The artist may then have to run a second query to locate a desired image in a desired color combination from the pool of several images. For example, the artist may have to specifically configure a query to fetch all images that are associated with the keyword "ocean" and that are blue in color. The above mentioned query may be run by the existing image search systems to perform a two layered image search i.e. first images are searched by a keyword and the retrieved images are then searched by the color. Thus, the existing image search systems do not offer a palette selection option, coupled with a keyword search option. Further, the artist using existing image search systems may have to reinvent a palette for each keyword search since there does not exist a way to save and export preferred color pallets. Furthermore, the artist does not have a way to take advantage of image selection trends reflected by the image retrieval and download data gathered from the previous searches performed on the particular keyword and color selection. Accordingly, a need exists for a palette selection system that can present images based at least on the image trend, the color criteria and the keyword criteria.

BRIEF SUMMARY

By way of introduction only, the present embodiments provide a method and system for conducting image search comprising: searching a first database to locate a set of pertinent images, iteratively performing the following operations for each image in the set of pertinent images (a) extracting the histogram of red green and blue colors (RGB colors) from a given image (b) distilling the extracted RGB colors down to create a reduced color palette for the given image (c) segmenting the extracted RGB colors into a set of segments representing distinct parts of the color spectrum (d) selecting a subset from the set of segments to assemble a color palette for the given image (e) updating the assembled color palette and a customer behavior score for the given image in the first database; and generating a ranked display of suggested color palettes for the search query by aggregating the customer behavior scores for the search query across all images.

The disclosed system may present users with multicolor palettes that best match the searched concept and the keyword. Among the presented multicolor palettes, a specific multicolor palette can be selected by the user in order to retrieve all images in the given image depository that match the specific palette and the user specified keyword. Alternatively, the disclosed system may allow the user to create a palette and retrieve all images in the image depository that match the user specified palette and the user specified keyword.

According to one aspect of the present invention, systems and methods are disclosed for generating color palettes from the given image depository in response to a user query. In one embodiment of the disclosed system, a high volume of color combinations can be generated automatically for a search query.

According to another aspect of the present invention, systems and methods are disclosed for designing a color palette. When an artist is searching for the keyword "ocean," the Internet search engine may return a large number of images associated with the keyword ocean in various colors and shades. For example, the above mentioned query may return color palettes containing various shades of blue from the photos of water, various shades of browns from the photos of beaches, the various shades of reds from photos of ocean sunsets, and the like.

In another embodiment, the system has an ability to display trends for a given image. Thus, the user can optionally select an image that was downloaded by many other users. Accordingly, the system may define popular palettes for certain groups of customers. For example, a popular palette may indicate specific images that are popular among college students just in time for Valentine's Day. In another embodiment, the system may have the ability to suggest color themes based on seasonal or popular trends, for example certain red and green palettes may be especially popular around Christmas time.

In yet another embodiment, the system has the ability to help customers configure their desired palettes. Additionally, the system may allow customers to discover palettes configured by others as well as save or export a particular palette that is of interest to the customer. This may save customer time, money and other resources required to reinvent that palette that works for the customer.

Although the features and advantages of the invention are generally described in this summary section and the following detailed description section in the context of embodiments, it shall be understood that the scope of the invention should not be limited to these particular embodiments. Many additional features and advantages will be apparent to one of ordinary skill in the art in view of the drawings, specification, and claims hereof.

In another embodiment, relevant search queries are further sorted by using user search data to score color palettes by the keyword. Thus, a high volume of color combinations can be applied to locate relevant images in response to the search queries.

BRIEF DESCRIPTION OF SEVERAL VIEWS OF THE DRAWINGS

The patent or application file contains at least one drawing executed in color. Copies of this patent or patent application publication with color drawing(s) will be provided by the Office upon request and payment of the necessary fee.

FIG. 7 depicts manner in which the customer behavior scores per keyword are added up from each image that the color palette was extracted from;

FIG. 10 depicts an exemplary set of mathematical operations that can be performed to compute the color weight score.

DETAILED DESCRIPTION OF THE PRESENTLY PREFERRED EMBODIMENTS

The present disclosure describes a computer implemented method for conducting a keyword, a color and a trend based image search in response to a user presenting a search query on a user interface of a computing device, the method comprising (1) searching a first database to locate a set of pertinent images corresponding to the search query, the first database comprising an image representation (image), a set of keywords associated with the image, a customer behavior score for each keyword in the set of keywords, and a list of keywords previously used to locate the image; (2) iteratively performing the following operations for each image in the searched set of pertinent images: (a) extracting the histogram of red green and blue colors (RGB colors) from a given image, (b) distilling the extracted RGB colors down to create a reduced color palette for the given image based on the proximity of the extracted RGB colors in the RGB color space, (c) segmenting the extracted RGB colors into a set of segments representing different, visually distinct parts of the color spectrum, and black and white colors, (d) selecting a subset of segments from the set of segments satisfying a predetermined criterion to assemble a color palette for the given image, and (e) updating the assembled color palette and the customer behavior score for the given image in the first database; and (3) generating a ranked display of suggested color palettes for the search query by aggregating the customer behavior scores for the search query across all images from which the color palette was extracted from.

Figure 1:
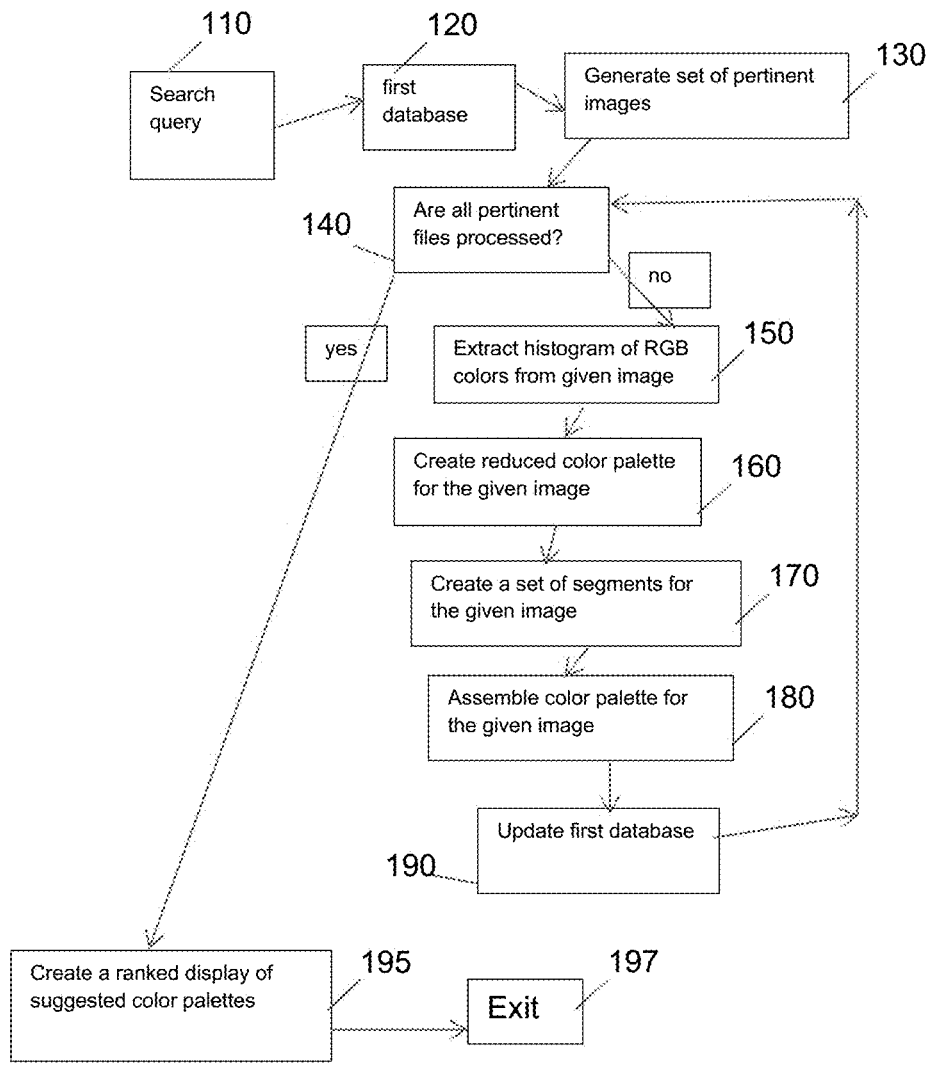
FIG. 1 illustrates a flow chart depicting various steps performed in conducting a keyword, a color and a trend based image search according to the preferred embodiment of the disclosed method.

Now referring to FIG. 1 illustrating a flow chart depicting various steps performed in conducting a keyword, a color and a trend based image search according to the preferred embodiment of the disclosed method. The process may receive a search query from a user via a user interface of a computing device, not shown in FIG. 1, at block 110. The search query may indicate user's interest in searching images for the specified keyword for example, a sea. Notably, the user may not specify a color of desired image at this point. However, in another embodiment, the user may indicate the intended image color and shade. The process may conduct image search based on the user specified keyword and color constraint. In yet another embodiment, after the process suggests a ranked display of suggested color palettes, the user may disregard the ranking and configure a custom color pallet as per the user's individual preference.

The process may at block 120 search a first database to fetch all the images that satisfy the keyword criterion specified in the search query. All the images that meet the searched keyword criteria are herein referred to as a set of pertinent images, since these images may possibly be of interest to the user. In other words, the process may search a first database to locate a set of pertinent images corresponding to the search query. At block 130, the process may generate a set of pertinent images for the user after searching the first database at block 120. The first database may comprise several records, each record may have an associated image representation (image), a set of keywords associated with the image. Furthermore, each record may also have a customer behavior score for each keyword in the set of keywords, and a list of keywords that were previously used by other users to locate the image.

In one embodiment of the disclosed invention, the customer behavior score is based on aggregated activity for an image (user activity received in a computing device). This may include searches that were conducted in the past which led the user to indicate interest in the given image. User interest is indicated by the user purchasing the image, the user clicking on the image, or displaying other signals indicating the user's interest in that image. In this context, the other signals may include for example, the user adding the image to a lightbox or favorites list, and hovering the cursor over the thumbnail image to view a larger preview, or performing any of the above mentioned activities on images contributed by the same artist from the same photo shoot or illustrated image set. In this embodiment of the disclosed invention, the customer behavior scores may be aggregated per search query and used to identify the most relevant keywords or categories for an image.

In another embodiment of the disclosed invention the customer behavior scores may be aggregated over a period of time and may represent customer activity for a specific period of interest such as a season. For example, an abstract image of a red and green background may generate more customer interest in the Christmas season. As a result, the image is likely to receive a disproportionate number of its annual purchases during the three month period prior to Christmas time as compared to other images having the color schemes that are unrelated to Christmas. If a particular image received higher volume of customer activity during a specific time of the year, then the disclosed search system can rank the particular image higher in results during the same time of year. For example, if 30% of the total image downloads for image A had occurred in the month of November, and for 10% of total image downloads for image B had occurred in the month of November, then the image A will be ranked higher than image B in search results during the month of November.

At block 140, the process may determine whether all of the pertinent images generated at block 130 are processed. If the process determines that all pertinent files processed are not yet processed, then the process iteratively performs the operations described in conjunction with blocks 150-190 for each image in the searched set of pertinent images. In other words, the process iteratively performs the operations described in conjunction with blocks 150-190 until all the images for each image in the searched set of pertinent images are processed. In this context, the term "given image" indicates a particular image from the set of pertinent images upon which the operations described in conjunction with blocks 150-190 are being performed.

First, the process may move to block 150 to extract the histogram of red green and blue colors (RGB colors) from a given image. The process of extracting histogram of red green and blue colors (RGB colors) from a given image is further illustrated in conjunction with FIG. 2. At this point, the process may consider the following image data: a thumbnail representation of the given image, which may be an approximately 100 pixels on a side representing a shrunken version of the full size image, a list of keyword tags associated with the given image; and a list of keywords that were used by customers to find the given image along with a score based on customer behavior for the given image.

Then the process may move to block 160 to distill the extracted RGB colors down to create a reduced color palette for the given image based on the proximity of the extracted RGB colors in the RGB color space. Then the process may move to block 170 to segment the extracted RGB colors into a set of segments representing different, visually distinct parts of the color spectrum, and black and white colors before moving to block 180 to select a subset of segments from the set of segments that satisfy a predetermined criterion to assemble a reduced color palette for the given image. Finally, the process may update the assembled reduced color palette and the customer behavior score for the given image in the first database before returning to block 140 to determine whether all pertinent files are processed.

Alternatively, at block 140, if the process determines that all pertinent files are processed, then the process may move to block 195 to generate a ranked display of suggested color palettes for the search query by aggregating the customer behavior scores for the search query across all images from which the color palette was extracted from. Then the process may exit at block 197.

Figure 2:
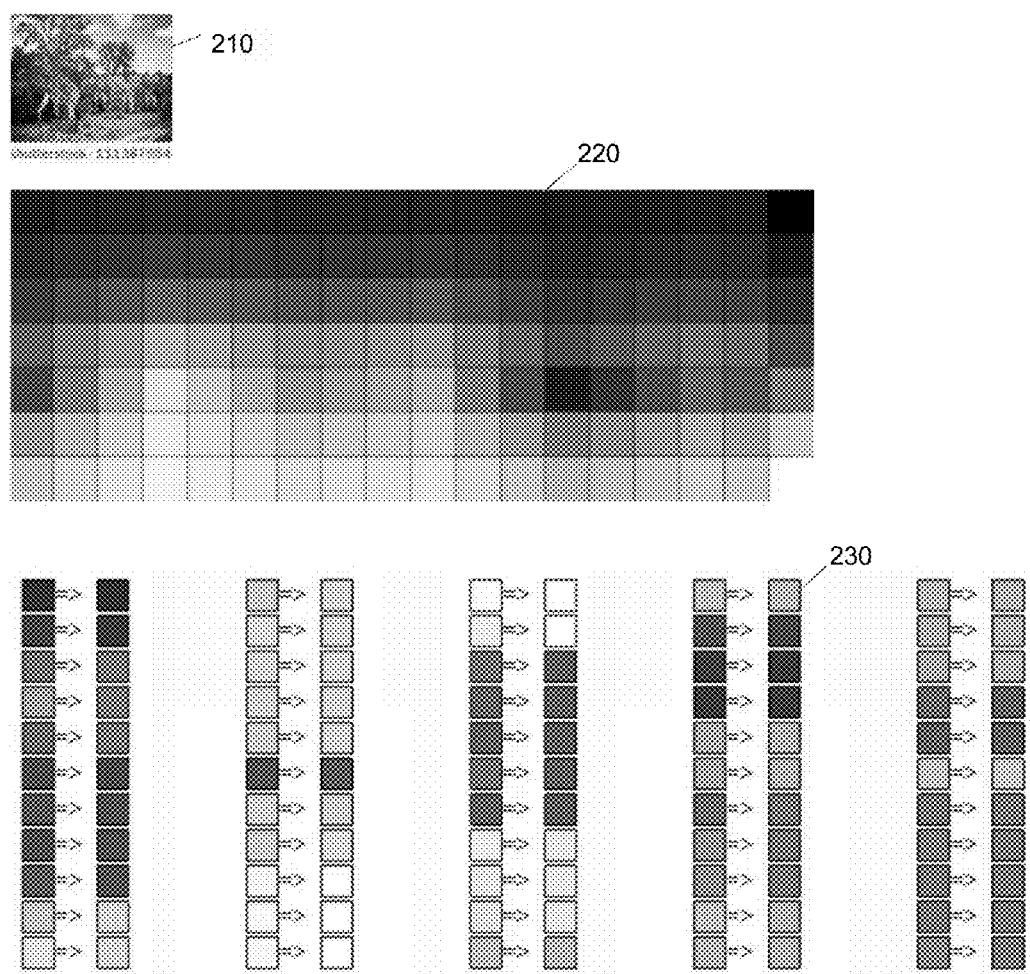
FIG. 2 illustrates an example of a reduced color palette, wherein the colors extracted from the image are distilled down to values present in the reduced color palette.

FIG. 2 illustrates an example of a reduced color palette, wherein the colors extracted from the given image are distilled down to values present in the reduced color palette 220. An image 210 is a thumbnail representation of a given image from the set of pertinent images as described above in conjunction with FIG. 1. The image 210 may be a shrunken version of the full size image and can be of a 100 pixels on a side dimensions. As described above, the process may extract the histogram of RGB colors from the image thumbnail 210 and distill the extracted RGB colors down to create a reduced color palette 220 for the image 210 based on the proximity of the extracted RGB colors in the RGB color space.

The process may iteratively process each color in the reduced color palette by performing a set of operations for each color in the reduced color palette. In particular, the process may iteratively perform, for each color in the reduced color palette, the operations of assigning (1) a color volume score to the given color (2) a color weight score to the given color, and (3) the percentage of a set of proximate colors. The process may assign the color volume score to each color in the reduced color palette at block 229. The color volume score may be assigned to each color in the reduced color palette based on the amount of that individual color present in the given image.

In other words, the color volume score for a given color may indicate the percentage of the given image covered by the given color. Thus, in an image of sky, where blue color covers the entire image of the sky, the color volume score for blue color will be 100%. In contrast, in a blue and green colored image depicting birds, where some birds are flying in the blue sky up high and some birds pecking seeds in the green grass below, the color volume score for the color blue will be less than 100% since the green grass will occupy at least some percentage of the image. Likewise, the colors of the birds will also occupy some percentage of the image.

Figure 3:
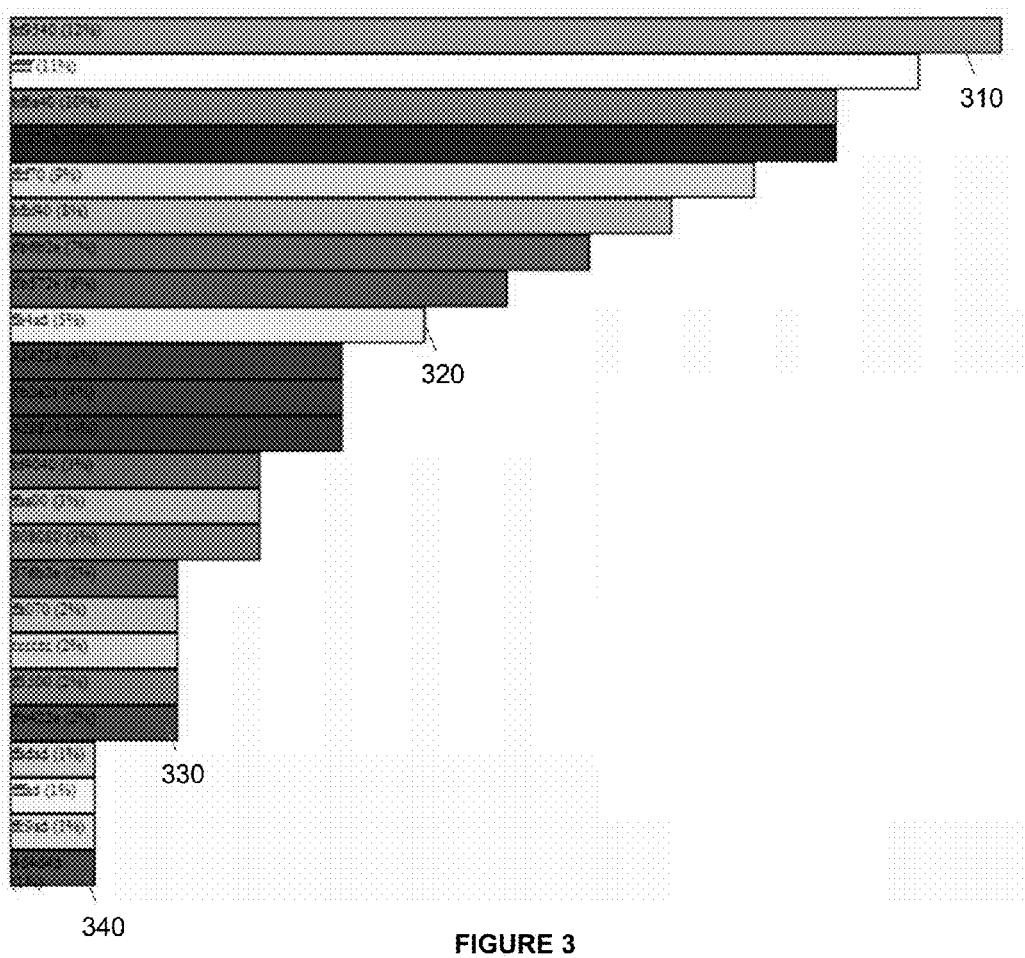
FIG. 3 depicts the manner in which a plurality of color segments are defined based on visually distinctive regions of the spectrum.

This phenomenon is described further in detail in conjunction with FIG. 3. Now referring to FIG. 3. FIG. 3 depicts the manner in which a plurality of color segments are defined based on visually distinctive regions of the spectrum. The color bf9540 indicated by the reference numeral 310 has occupied 12% of the image, this color volume score is in sync with the thumbnail representation of the image 210 since mustard color does appear to cover 12% of the image 210. Likewise, the color ffe4ed indicated by the reference numeral 320 has the color volume score of 5% since off white color appears to have occupied 5% of the thumbnail representation of the image 210. Similarly, 6b422e indicated by the reference numeral 330 has the color volume score 2% and the color 4d4d4d indicated by the reference numeral 340 has the color volume score 1%.

Furthermore, the process may iteratively assign a color weight score for each color in the reduced color palette. The color weight score may indicate the percentage of the given color in the given image. Notably the term "given image" is an image from the set of pertinent images that is currently being processed and the term "given color" is a color from the reduced color palette that is being assigned the color weight score. The color weight score may be based on the occurrence of other visually similar colors in the given image. The color weight score may indicate a numeric score based on the percentage of the given color in the given image, and the percentage of other colors located within a certain predefined distance in the RGB color space from the given color, and the measure of distance between the given color and the other colors situated within the certain predefined distance in the RGB color space from the given color.

Figure 9:
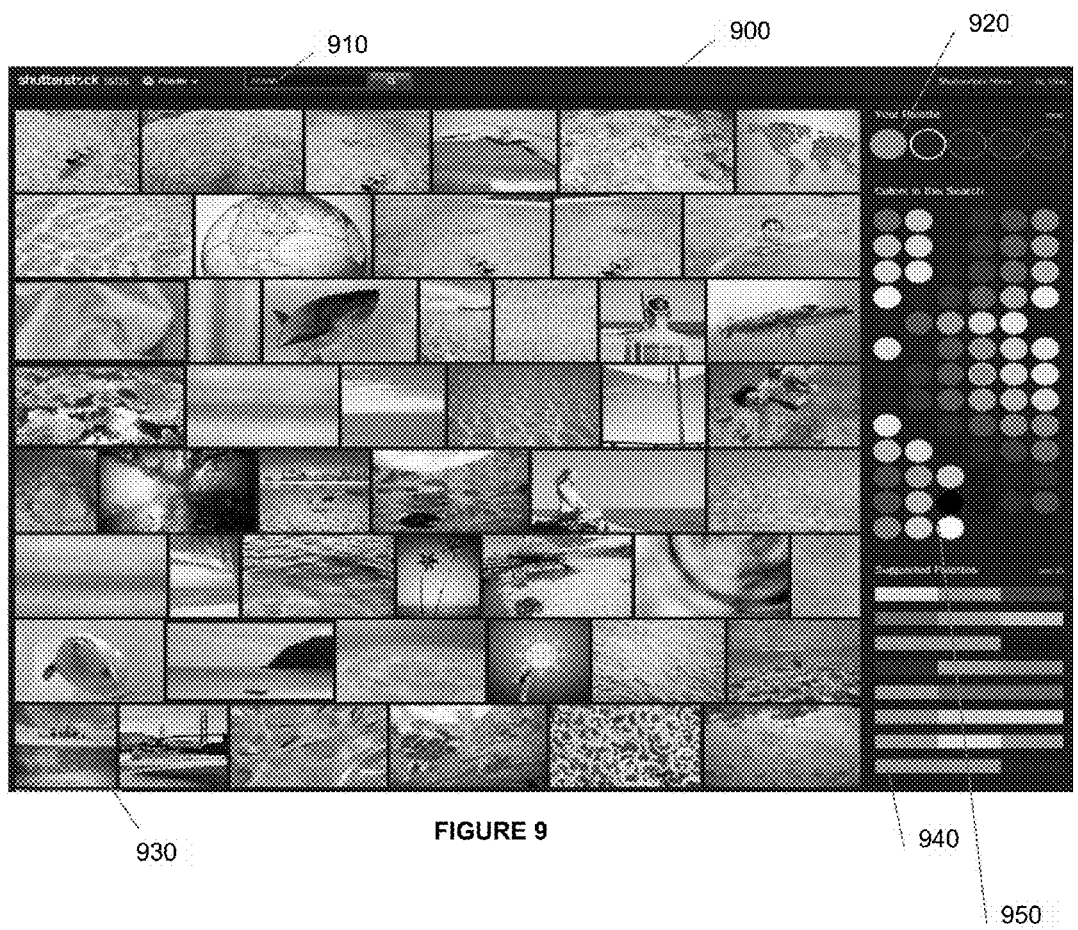
FIG. 9 illustrates a process of ranking the color palettes based on the customer behavior score of the keywords matching the search query.

A set of mathematical operations may be performed to compute the color weight score. One example of a formula is illustrated in FIG. 9. As indicated in FIG. 9, the weight of a color is weighted up or weighted down by either by color percentage of the given color in the given image or by the color distance of the given color and every other color in the given image. However, other formulae may also be used to compute the color weight score. The color weight score may be used to ascertain how closely related are the colors in the given image. For example, in a given image, a shade of green may have a higher color weight score if the given image is covered by a wide variety of greens. However the same shade of green may be weighted lower if it the given image is covered completely by shades of red.

Further, for each given color, the process may also identify a set of proximate colors such that each color in the set of proximate colors is located within a predefined distance from the given color in the RGB color space. Next, the process may ascertain the percentage of a set of proximate colors in the given image. The process may also identify the measure of the distance between the given color and the set of proximate colors in the RGB color space. Finally, the process may perform the indexing operations on the color volume score, the color weight score, the customer behavior score and the percentage of the set of proximate colors for the given color in a search engine. The indexing operations may be helpful in a subsequent image search of the given image via the search engine.

Now referring back to FIG. 2. The process then may divide or segment the extracted RGB colors into a set of segments or buckets 230 wherein the set of segments may represent different, visually distinct parts of the color spectrum, and black and white colors. After generating the set of segments, the process may select a subset of segments satisfying a predetermined criterion to assemble a color palette for the given image, and update the assembled color palette and the customer behavior score for the given image in the first database. Finally, the process may generate a ranked display of suggested color palettes for the search query by aggregating the customer behavior scores for the search query across all images from which the color palette was extracted from. This phenomenon is illustrated in FIG. 4.

Figure 4:
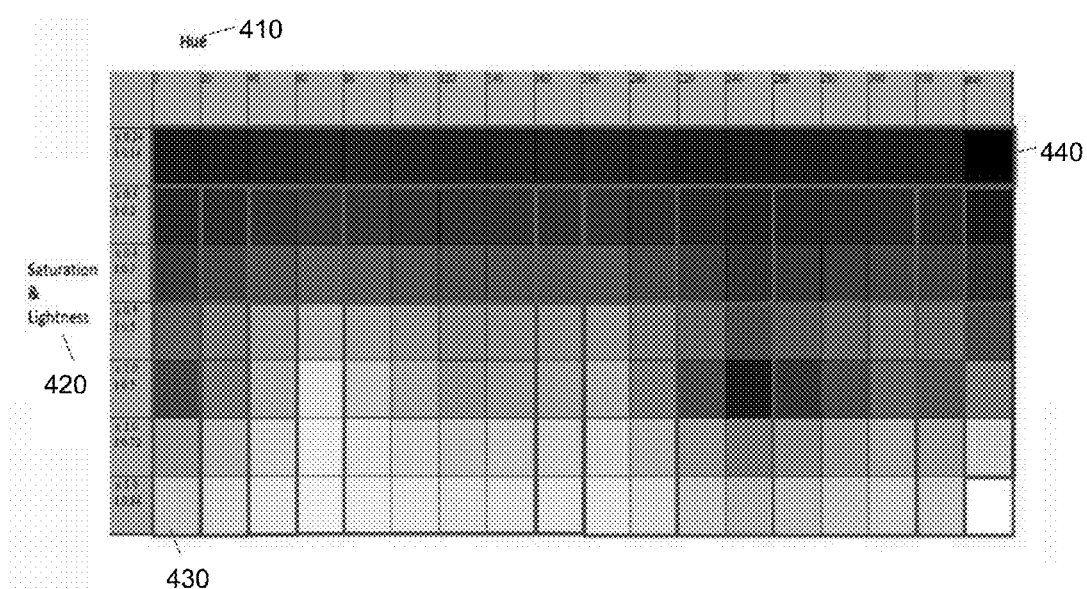
FIG. 4 indicates the fashion in which the colors from the reduced color palettes are divided up into clusters.

Now referring to FIG. 4 which indicates the fashion in which the colors from the reduced color palettes are divided up into clusters. In FIG. 4, x axis represents a hue value 410 of the given shade of the given color and y axis represents a saturation and lightness value 420 for the given shade of the given color. For example, a very light shade of peach color indicated by reference numeral 430 appears to have least hue value 410 as well as least saturation and lightness value 420. Likewise, a very dark shade of gray color indicated by reference numeral 440 appears to have maximum hue value 410 as well as maximum saturation and lightness value 420. The colors that were extracted from the given image are divided up into segments or buckets representing different visually distinct parts of the color spectrum, plus black and white colors. According to one embodiment of the disclosed invention, the segments may be defined manually by dividing the color spectrum into sections that are visually distinct from each other. In another embodiment, the segments may be defined algorithmically using a variety of algorithmic techniques.

For each segment in the set of segments, the process may iteratively assign a color score to each color in a given segment to ascertain a color that represents the given segment as a whole. In this context, the term "given segment" indicates a particular segment from the set of segments, wherein each color in the particular segment is being assigned a color score. The segment score maybe determined by a product of the color volume score, a color lightness measure and a color chroma measure and wherein the color having the highest color score in a given segment is designated to represent the given segment.

To compute the color score for a specific color, the specific color is converted to the LCH*color space, which produces three values: a lightness value, a chroma value, and a hue value for the specific color. The color score is determined by computing a product of the color volume score, the lightness value, and the chroma value. Resultantly, the color with the highest color score is the brightest, most saturated, and most abundant color in that segment. Accordingly, the color with the highest color score in a particular segment may be used to represent the particular segment.

Likewise, for each segment in the set of segments, the process may iteratively assign a segment score, wherein the segment score for a particular segment is computed by aggregating the color volume scores for each color in the particular segment. In other words, the segment score for a specific segment may be based on the sum of the color volume scores of each color in the given image within the specific segment. This phenomenon is further described in conjunction with FIG. 5.

Figure 5:
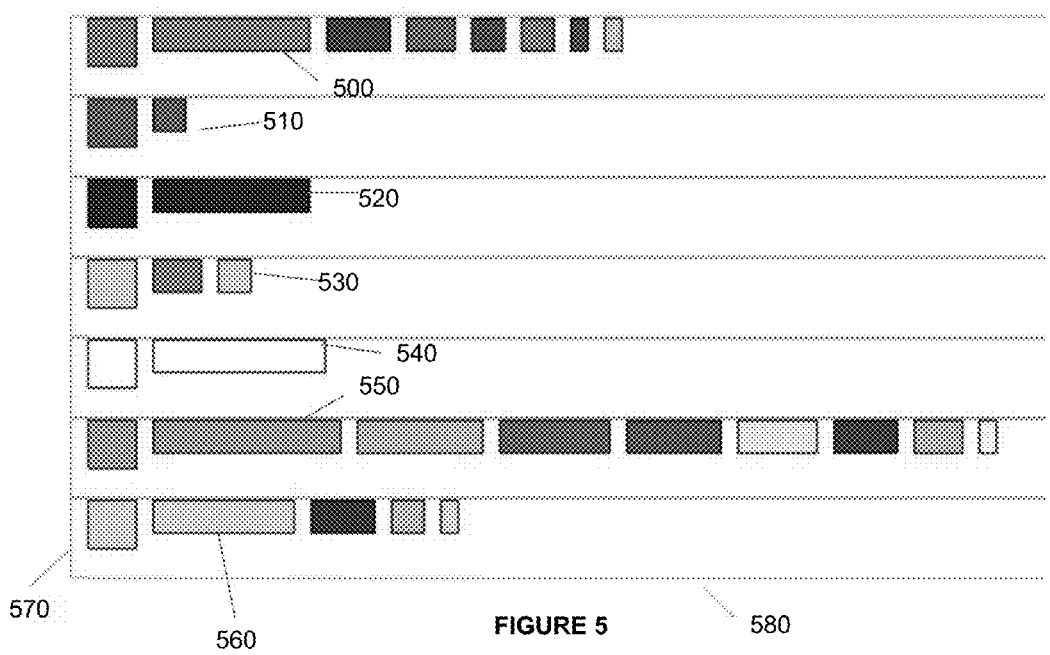
FIG. 5 depicts the process of scoring the color segments based on the volume of all the colors within the color segments.

Referring now to FIG. 5 illustrating the manner in which the colors may be divided into one or more clusters. In FIG. 5, x axis represents the segment score i.e. the aggregate color volume scores for each color in the particular segment 580 for the given segment and y axis represents the given segment 570. FIG. 5 depicts the process of scoring the color buckets based on the volume of all the colors within them (to calculate a bucket presentation score) wherein, the representative colors from the top buckets are used to generate a color palette for the given image. FIG. 5 depicts seven color clusters indicated by the reference numerals 500, 510, 520, 530, 540, 550, and 560. In one embodiment of the disclosed invention, the top three segments having the highest segment score may be selected in order to assemble a color palette that best represents the given image. In another embodiment of the disclosed invention, the top four segments having the highest segment score may be selected in order to assemble a color palette that best represents the given image. In this embodiment, the color from the color segments indicted by the reference numerals 550, 500, 560 and 520 may be selected to assemble a color palette.

Figure 6:
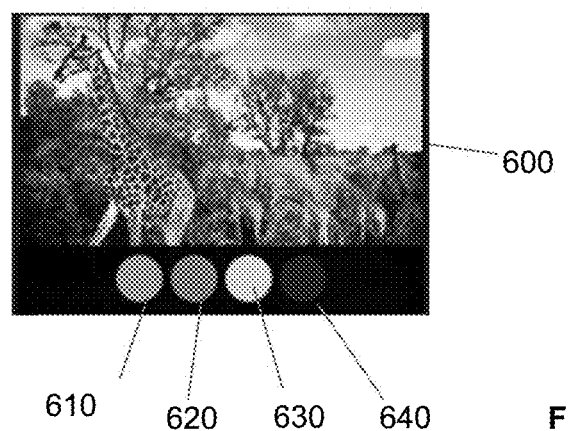
FIG. 6 depicts an example of the four color palette for a given image.

An example of the four color palettes derived from the image 600 is illustrated in FIG. 6. The color segments 610, 620, 630, and 640 in are selected to assemble a color palette that best represents an image 600. Notably, as shown in FIG. 5, the colors represented by the reference numerals 550, 500, 560 and 520 correspond to the color segments 610, 620, 630 and 640 respectively. The four the color segments 610, 620, 630 and 640 are scored based on the volume of all the colors the color segments 610, 620, 630 and 640. Thus, the representative colors from the top segments are used to generate a color palette for the given image 600.

In yet another embodiment of the disclosed invention, the top five segments having the highest segment score may be selected in order to assemble a color palette that best represents the given image. After generating the color palette that best represents the given image, the generated palette is then stored in a database along with the customer behavior scores for the given image from which the colors in the color palette were extracted. Notably, the disclosed invention may be used to derive any number of color palettes that best represents the given image. In another embodiment of the disclosed invention, the process may select a predefined number of segments having the highest segment scores for assembling a color palette representation for a given image.

A process may then iterate through all the color palettes and derive the aggregate customer behavior score for each unique color palette by summing up all the customer behavior scores per search query for each unique color palette. For example, if 10 images with the same color palette have a customer behavior score of 2 for the search query "water", then the palette will have an aggregate customer behavior score of 20 for the query "water". Each image may have customer behavior scores for multiple search queries. In that case, the palette may include a sum of customer behavior scores for each individual search query across all images. This phenomenon is illustrated in FIG. 7.

Figure 7:
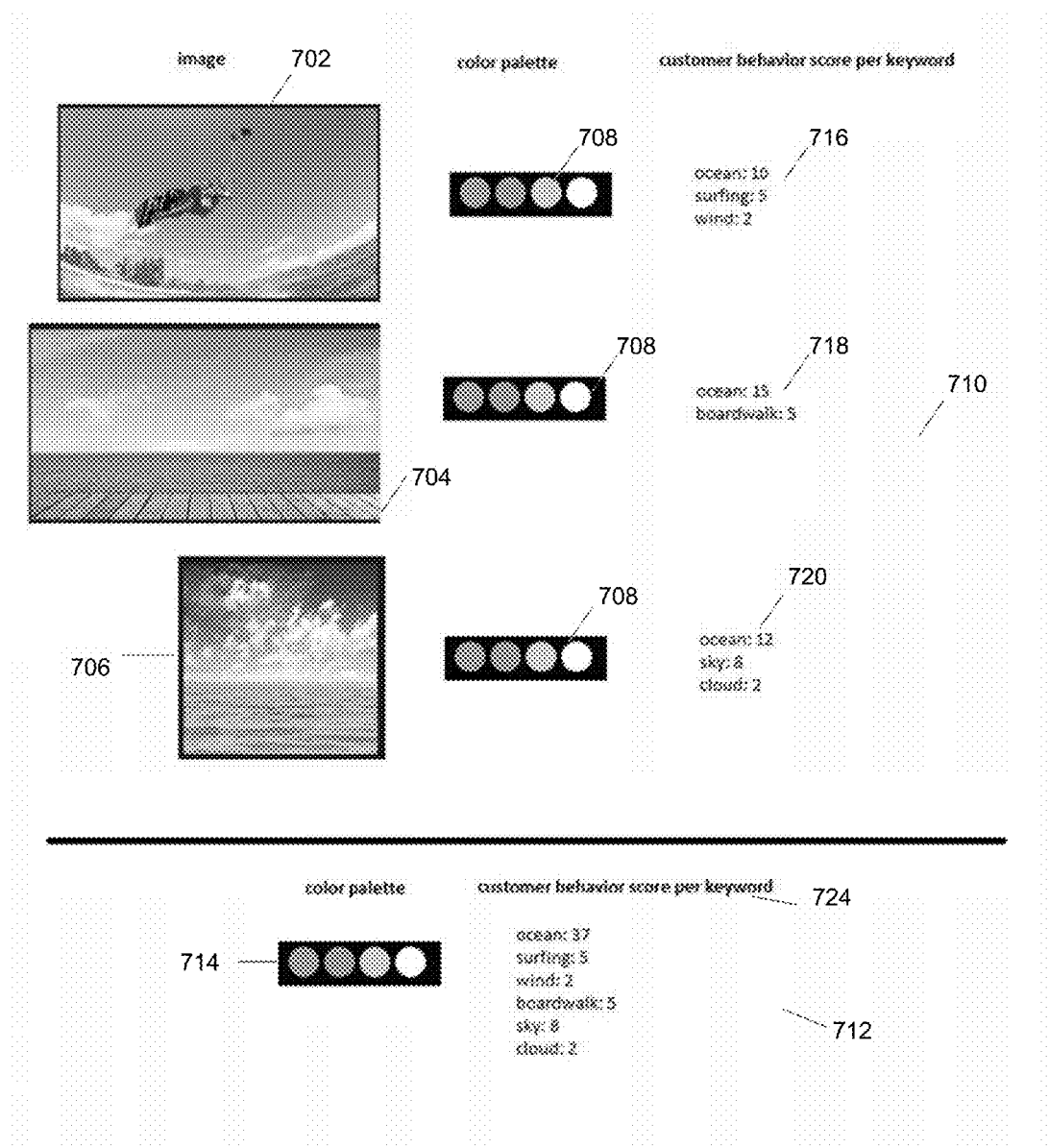

FIG. 7 depicts manner in which the customer behavior scores per keyword are added up from each image that a palette was extracted from. Upon receiving a search query comprising search criteria, the process fetches a set of pertinent images having associated keywords that match the searched criteria. For each image in the set of pertinent images, the process generates the color palettes and ranks the color palettes based on the customer behavior score per each keyword. This process of aggregating the customer behavior score per each keyword is illustrated via three images 702, 704, and 706 displayed in the area 710 of FIG. 7.

Also displayed in the area 700 is the color palette 708 along with the customer behavior scores 716, 718, and 720. As for image 702, the color palette 708 is extracted from image 702, which is an image of a parasailing person. As described above, the first database may an image representation (image), a set of keywords associated with the given image, a customer behavior score for each keyword in the set of keywords, and a list of keywords previously used to locate the given image.

In FIG. 7, three keywords: ocean, surfing and wind which are indicated by reference numeral 716 are associated with the given image 702. Likewise, the customer behavior scores for each keyword associated with the given image 702 are stored in the first database. For example, the keywords ocean, surfing, and wind each have the customer behavior score of 10, 5 and 2 respectively.

Similarly, for image 704, the color palette 708 is extracted from image 702, which is an image of a boardwalk. In FIG. 7, two keywords: ocean and boardwalk indicated by reference numeral 718 are associated with the given image 704. The customer behavior scores for the keywords: ocean and boardwalk are 15 and 5 respectively. Also shown in FIG. 7 is image 706 which is an image of a sea. The color palette 708 is extracted from image 706 and three keywords: ocean, sky, and cloud indicated by reference numeral 720 are associated with the image 706. The customer behavior scores for the keywords: ocean, sky, and cloud are 12, 8 and 2 respectively.

The process may aggregate the customer behavior scores per search query and use the customer behavior scores to identify most relevant keywords or categories for a given image. For example, as shown in area 712 of FIG. 7, for keyword ocean the process may add the customer behavior score 10 for image 702, the customer behavior score 15 for image 704 and the customer behavior score 12 for image 706, thus the aggregate customer behavior score 724 for keyword ocean is 37. Whereas the keyword surfing has the aggregate customer behavior score 5 since the keyword surfing only appeared once for image 702 with the customer behavior score 5. Similarly, in FIG. 7, the keywords wind, boardwalk, sky and cloud each have the aggregate customer behavior scores 2, 5, 8 and 2 respectively.

In one embodiment of the disclosed invention, the process may aggregate the customer behavior scores over a period of time and use the customer behavior scores to represent a customer activity for a specific period of interest. In another embodiment of the disclosed invention, the customer behavior score may be based on the previous searches indicating user interest in a given image. In this embodiment, the user interest may at least be indicated by one of the following: the user purchasing the given image, the user hovering a cursor over a thumbnail version of the given image to view an enlarged version of the given image, the user adding the given image to a favorites list, and the like.

Figure 8:
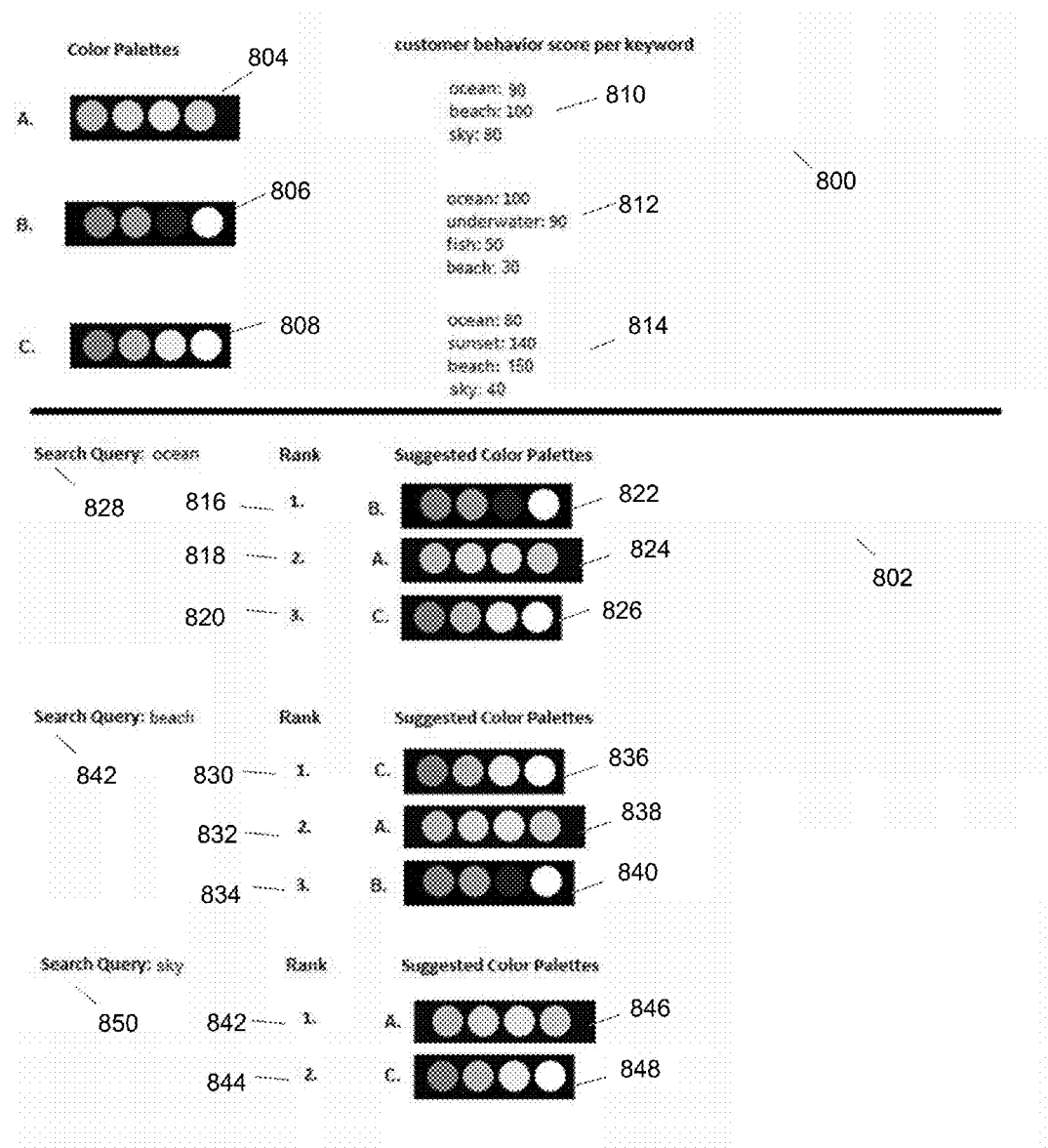
FIG. 8 illustrates a process of ranking the color palettes based on the customer behavior score of the keywords matching the search query.

Now referring to FIG. 8 illustrating a process of ranking the color palettes based on the customer behavior score of the keywords matching the search query. After performing the operations described in FIG. 7, the process may obtain a resulting data set containing color palettes linked to the sum of all the customer behavior scores from all the images that match a given color palette. This data can then be used to rank color palettes based on a search query. If palette A has a customer behavior score of 90 for keyword ocean, a score of 100 for keyword beach and a score of 80 for keyword sky, and palette B has a score of 100 for keyword ocean and a score of 30 for keyword beach, then palette A will be ranked first if the user enters a query for keyword beach and palette B will be ranked first if the user enters a query for keyword ocean. Resultantly, if a user invokes a query for keyword sky, then the process may display Palette A but may not display palette B to the user, since the keyword sky does not appear in palette B.

Displayed in the area 800 are the color palettes 804, 806, and 808 along with the customer behavior scores 810, 812, and 814. The color palette 804 has three associated keywords: ocean, beach, and sky, the customer behavior scores 810 for these keywords are 90, 100 and 80 respectively. Likewise, the color palette 806 has four associated keywords: ocean, underwater, fish, and beach, where the customer behavior scores 812 for these keywords are 100, 90, 50 and 30 respectively. Finally, the color palette 808 has four associated keywords: ocean, sunset, beach, and sky, where the customer behavior scores 814 for these keywords are 80, 140, 150, and 40 respectively.

Now referring to the display area 802 in FIG. 8 showing a ranked display of the suggested color palettes per search query. For the search query 828 where images for the keyword ocean are being searched, the customer behavior score for this keyword is 90 for palette A, 100 for palette B, and 80 for palette C. Thus, the first rank 816 is allocated to the suggested color palette B referenced by the reference numeral 822. Similarly, the second rank 818 is allocated to the suggested color palette A referenced by the reference numeral 824 and the third rank 820 is allocated to the suggested color palette C referenced by the reference numeral 826.

Likewise for the search query 842 where images for the keyword beach are being searched, the customer behavior score for this keyword is 100 for palette A, 30 for palette B, and 150 for palette C. Accordingly, the first rank 830 is allocated to the suggested color palette C referenced by the reference numeral 836. The second rank 832 and the third rank 834 are allocated to the suggested color palette A referenced by the reference numeral 838 and the suggested color palette B referenced by the reference numeral 840 respectively.

Similarly, for the search query 850 where images for the keyword sky are being searched, the customer behavior score for this keyword is 80 for palette A, and 40 for palette C. Therefore, the first rank 842 is allocated to the suggested color palette A referenced by the reference numeral 846 and the second rank 844 is allocated to the suggested color palette C referenced by the reference numeral 848. Notably, because the keyword sky is not associated with the images from which the color palette B is derived from, the color palette B referenced by the reference numeral 806 is not listed in the ranked display of suggested color palette for the search query for the keyword sky.

Now referring to FIG. 9 illustrating search results displayed in response to a search query entered by a user. As described above, the process may generate a ranked display of suggested color palettes for the search query by aggregating the customer behavior scores for the search query across all images from which the color palette was extracted from. The ranked display of suggested color palettes is shown in FIG. 9. Interface 900 shows selective set of images derived in response to the search query. Area 900 illustrates a search box 910 where the user may enter a keyword to conduct a search query.

In FIG. 9, for example, the user has entered the keyword ocean in the search box 910. Responsively, the selected pallet 920 is displayed at location 920. The colors of the images shown on the interface 900 indicated by the reference numeral 930 are taken from the colors in the selected pallet indicated by the reference numeral 920. The area 950 on the interface 900 indicates the different colors that are displayed in the images 930 on the interface 900. Likewise the suggested color palettes 940 are displayed on the interface 900. The interface may dynamically change the images 930 that are displayed on the interface 900 in response to the user selecting any palette from the list of the suggested color palettes 940 to replace the selected color palette 920.

The claimed system and method may also be configured to receive data including a list of keyword tags provided with the image and a list of keywords used by customers to find said image along with a score based on customer behavior.

The customer behavior score may be based on aggregate user activity for an image. This includes searches that lead to purchases of said image, clicks on said image, or other signals that indicated that the user was interested in said image—for example, adding said image to a lightbox or favorites list and hovering the cursor over a thumbnail of said image to view a larger preview, or doing any of the above activities on images contributed by an artist from a photo shoot of said image or illustrated image set. Customer behavior scores are aggregated per search term and used to identify the most relevant keywords or categories for an image.

The claimed system and method aggregate customer behavior scores over a period of time. Said customer behavior scores may represent customer activity for a specific period of interest. For example, said specific period may include one season of a year. An abstract image of a red and green background may generate more customer interest in a winter holiday season. As a result, the image will receive a disproportionate number of its annual purchases during the three month period prior to Christmas compared to other images with color schemes unrelated to Christmas. In years that follow, in one embodiment the claimed system and method weigh that image higher in results during a time of year that it received higher volume of customer activity. If one image received 30% of its downloads during November, and another image received 10% of its downloads during November, then the claimed system and method will rank the former image higher in search results during the month of November.

The claimed system and method extract the histogram 220 of red, green, and blue, hereinafter, "RGB," colors from the image thumbnail 210 and distill said extracted colors down to a reduced palette 230 based on their proximity in a RGB color space.

The claimed system and method assign each of the reduced colors a score 310, also referred to as a "color volume score," based on a percentage of an image that is covered by that individual color. FIG. 3 represents the system and method assigning each of the reduced colors a color volume score.

The claimed system and method then give each color a second weight score, referred to as a color weight score, which is based on occurrence of other visually similar colors in an image. As reflected in FIG. 10, the claimed system and method use an equation to compute weight of a color in an image. A key (2000) establishes definitions of values: a value n represents a number of colors in said image, a value D represents distance between two colors in said LCH color space, said value D equaling a value between and including 0 and approximately 300, a value P represents percentage of image percentage of image covered by a given color, said value P equaling a value between and including 0 and 100, and a variable x represents a specific color being assigned a weight via the equation. Weight for a given color 2001 is equal to P[x] multiplied by an aggregated product, iterated n times, from 1 to n, whereby a factor is equal to (1+100*((P[i]/100)*(D[x,i]/300)) if D[x,i] is less than or equal to 40 (20002), or instead equal to (1−100*((P[i]/100)*(D[x,i]/300)) if D[x,i] is greater than 40 (2003).

This weight is a numeric score based on percentage of a color in the image, and the percentage of other colors within a certain predefined distance in the RGB color space, and a measure of distance between those colors in the RGB color space. In this way, the claimed system and method will score a shade of green higher if a wide variety of greens cover an image but the claimed system and method will weight said shade lower if shades of red completely cover said image.

As noted previously the claimed system and method extract colors from an image and distill said colors to a palette. FIG. 4 represents the division of extracted colors. The claimed system and method assign each color within each bucket a bucket color score in order to determine which color should represent the bucket as a whole. To calculate this score, the color is converted to the lightness, chroma 420, and hue 410, hereinafter, "LCH," color space which produces three values: lightness, chroma, and hue. The claimed system and method determines score by multiplying color volume score by lightness by chroma. The result is that the brightest, most saturated and most abundant color—the color with the highest score—in the bucket will be used to represent said bucket.

The claimed system and method divide the extracted colors into buckets representing different visually distinct parts of the color spectrum, a spectrum which includes black and white. In one embodiment, the claimed system and method define the buckets manually by segmenting the color spectrum into sections that are visually distinct from each other. In another embodiment, the claimed system and method define the buckets algorithmically using a variety of techniques.

In one embodiment, three buckets with bucket color scores ranking highest are selected in order to assemble a color palette that best represents their corresponding image. The claimed system and method score buckets based on an aggregation of volume of each color in the image within a bucket. FIG. 5 represents scoring of said buckets. This method is repeated to create palettes with three, four, or five colors. FIG. 6 represents a result of scoring of color buckets based on volume of all colors in said buckets for a given image 600. Representative colors from top buckets are used to generate a color palette (610, 620, 630 and 640) for the image.

The claimed system and method index each piece of data: color volume score, color weight score, and customer behavior score in a search engine to serve user queries.

The claimed system and method then store a palette for an image in addition to customer behavior scores from an image from which colors were extracted.

The claimed system and method can iterate operation throughout the entire collection of images.

As demonstrated in FIG. 8, the claimed system and method traverse through all palettes 708 and aggregates all customer behavior scores (e.g. 716, 718 and 720) per search term for each unique color palette. If ten images each with an identical color palette have a customer behavior score of 2 for the search term "water," then the palette will have a total customer behavior score of 20 for the query "water." Each image may have customer behavior scores for multiple search queries. A palette includes a sum of customer behavior scores for each individual search term across all images.

The claimed system and method produce a data set containing color palettes linked to a sum 712 of all customer behavior scores (e.g. 716, 718 and 720) from all images (e.g. 702, 704 and 706) that match a given color palette 714.

By way of example, if a user runs a query for "sky," the claimed system and method will display the proper palette (e.g. 804, 806 and 808) according to customer behavior score (e.g. 810, 812 and 814) for a specified search term—in this example, "sky." In one embodiment, the claimed system and method use this data to rank color palettes based on a search term 828. For example, if palette A has a customer behavior score of 90 for "ocean," a score of 100 for "beach," and a score of 80 for "sky," and palette B has a score of 100 for ocean and a score of 30 for beach, then the claimed system and method will rank palette A first if the user enters a query for "beach" and palette B will be ranked first if the user enters a query for "ocean."

The claimed system and method provide a user with a web interface where said user can enter at least one keyword as a search term 910. FIG. 9 represents a web interface interface. Once a user inputs a search term 910, the claimed system and method will display a grid of at least one image 930 matching said search term. Then the claimed system and method will display a list of colors 940 that are present among all image search results. The claimed system and method will sort said colors by a number of matching images in said image search results. The claimed system and method will list and sort palette suggestions 950 based on the customer behavior score for a matching search term. The user can also create a palette 920 using said list of colors.

If a search yields multiple palettes that are visually similar, for example, said palettes sharing two colors while a third color is a near match, then the claimed system and method will remove said multiple palettes that are visually similar in order to provide better variety to a user. The claimed system and method filters palettes based on the following logic: (1) If a palette has N colors, create an index of all combinations of N−1 colors, (2) Count each set of N−1 colors present in the index, (3) If a set of N−1 colors occurs more than once then compare Nth colors for each of them, and (4) If distance between two of said Nth colors is below a predefined threshold, then remove one color palette from said results.

If the user selects a single color option, the claimed system and method update search results to show only images that match a keyword a given color. The claimed system and method match said given color with weighted colors retrieved from each image and secondarily on the volume of the color in each image. The claimed system and method update palette suggestions to only display palettes which match selected colors.

If a user clicks on a palette suggestion, the claimed system and method update search results to only display images that match a given color combination. The claimed system and method update palette suggestions to show multicolor palettes that contain colors of the given color combination. If the user selected a multicolor palette with three colors, the claimed system and method will display palette suggestions with four colors. If the user selected a palette with four colors, the claimed system and method will display palette suggestions with five colors.

If a user hovers over an image result, the claimed system and method will display a color palette that was extracted from said image result. If a user clicks on said palette (1) the claimed system and method will retrieve four top colors for said image result along with color volume scores for said image result, (2) the claimed system and method will enter said four colors into a search query along with color volume scores as boost parameters, (3) the returned image results will match all given colors and search terms, and (4) the claimed system and method will rank said results based on proximity in volume each color of said returned image results matches the volume of each color in said image result.

The claimed system and method enables a user to input a query with at least one and specify a weight for each color in order to retrieve a set of images that match proportions of each color in said query. In one embodiment the claimed system enables the user to define said proportions manually via a control on the interface. In one embodiment the claimed system and method (1) enable the user to specify volume of each color used in said query by providing or choosing any image from which the claimed system and method will extract a color histogram, and (2) enable the user to specify an assembled query which will include proportions of each color from said image.

The claimed system and method enable a user to save a palette s/he created and retrieve it later to apply it to a search query.

The claimed system and method display trending or popular palettes to users based on customer behavior scores. Customer behavior scores indicate popularity of a given palette for specific searches and at specific times.

We claim:

1. A data processing system for recommending a color palette comprising:
  a data processing unit to execute steps to:
   receive from a contributing user an image and at least one keyword;
   extract at least one color from the image to provide at least one extracted color;
   divide the at least one extracted color into reduced colors associated with visually distinct parts of a color spectrum, each of the reduced colors associated with a bucket;
   calculate a bucket representation score for the at least one extracted color by summing bucket color scores of each bucket of the image;
   generate a palette by assigning to the palette at least one reduced color from among the reduced colors, wherein the at least one reduced color is the reduced color having the highest bucket representation score for the at least one extracted color;
   determine a customer behavior score for the image based on aggregated activity for the image;
   obtain a color weight score for each reduced color in the image based on other visually similar colors to the respective reduced color in the image;
   obtain a color volume score for each reduced color based on a percentage of the image covered by the reduced color;
   index the customer behavior score, color weight score, and color volume score for a search engine;
   receive from a searching user a search query comprising a search term comprising the at least one keyword; and
   provide for display, a grid of search results comprising the image displayed according to the customer behavior score, the at least one extracted color from the image when the searching user interacts with the image, and at least one palette comprising the reduced color among colors ranked according to a customer behavior score associated with the at least one keyword, wherein the color weight score for each reduced color is calculated based on a percentage of the respective reduced color in the image, a percentage of other colors within a predefined distance of the respective reduced color in a red, green, and blue color space, and a measure of distance between the respective reduced color and the other colors within a predefined distance of the respective reduced color in a red, green, and blue color space.

2. The system of claim 1, wherein the customer behavior score is calculated based on user activity, the user activity including searches which lead to a purchase of the image, clicking activity on the image, or other signals which would indicate user interest in the image, and wherein the customer behavior score is weighted based on a specific period of a year.

3. The system of claim 1, wherein the colors of the at least one palette further comprise at least one color present among all images in the search results, and wherein the colors of the at least one palette are sorted by customer behavior score for the at least one keyword, and wherein the processor is further configured to permit the searching user to create another palette using the at least one color present among all images in the search results.

4. The system of claim 1, wherein the search results are ranked based on proximity of volume of each color of each image of said search results to volume of each extracted color in a selected image.

5. The system of claim 1, wherein the data processing unit is further configured to execute steps to:
display a second palette containing at least one extracted color from an image when said user hovers a cursor over the image;
display a third palette with a list of at least one color selected by a user; and
display one other color in the third palette.

6. The system of claim 1, wherein the data processing unit is further configured to execute steps to receive from the searching user a request to apply a previously-created palette to a future search query.

7. The system of claim 1, wherein the data processing unit is further configured to execute steps to:
define the buckets manually by segmenting the color spectrum into sections that are visually distinct from one another;
assign a bucket color score to each of the buckets, wherein the bucket color score is calculated by extracting the lightness, chroma, and hue values of the color associated with the respective bucket, and multiplying the lightness value by the chroma value and by the color volume score.

8. The system of claim 1, wherein the data processing unit is further configured to execute steps to generate a data set which contains a list of at least one color palette ranked by aggregated customer behavior scores.

9. The system of claim 1, wherein the data processing unit is further configured to execute steps to receive input of a search term and a color from the searching user and update the search results to display at least one image which matches the search term and said color.

10. A method for executing a data processing application for recommending a color palette, the method comprising the steps of:
receiving from a contributing user an image and at least one keyword;
extracting at least one color from said image to provide at least one extracted color;
dividing said at least one extracted color of said image into reduced colors associated with visually distinct parts of a color spectrum, each of the reduced colors associated with a bucket;
calculating a bucket representation score for the at least one extracted color by summing bucket color scores of each bucket of said image;
generating a palette by assigning to said palette at least one reduced color from among the reduced colors, wherein the at least one reduced color is the reduced color having the highest bucket representation score for the at least one extracted color;
determining a customer behavior score for the image based on aggregated activity for the image;
obtaining a color weight score for each reduced color in said image based on other visually similar colors to the respective reduced color in said image;
obtaining a color volume score for each reduced color based on a percentage of said image covered by said reduced color;
indexing the customer behavior score, color weight score, and color volume score for a search engine;
receiving from a searching user a search query comprising a search term comprising the at least one keyword; and
provide for display, a grid of search results comprising the image displayed according to the customer behavior score, the at least one extracted color from the when the searching user interacts with the image, and at least one palette ranked according to a customer behavior score associated with the least one keyword,
wherein the color weight score for each reduced color is calculated based on a percentage of the respective reduced color in the image, a percentage of other colors within a predefined distance of the respective reduced color in a red, green, and blue color space, and a measure of distance between the respective reduced color and the other colors within a predefined distance of the respective reduced color in a red, green, and blue color space.

11. The method of claim 10, wherein the customer behavior score is calculated based on user activity, the user activity including searches which lead to a purchase of the image, clicking activity on the image, or other signals which would indicate interest in the image, and wherein the customer behavior score is weighted based on a specific period of a year.

12. The method of claim 10, wherein the colors of the at least one palette further comprise at least one color present among all images in the search results, wherein the colors of the at least one palette are sorted by customer behavior score for the at least one keyword, and wherein the method further comprises permitting the searching user to create another palette using the at least one color present among all images in the search results.

13. The method of claim 10, wherein said application ranks the search results are ranked based on proximity of volume of each color of each image of the search results to volume of each extracted color in a selected image.

14. The method of claim 10, further comprising:
- displaying a second palette containing at least one extracted color from an image when the user hovers a cursor over the image;
- displaying a third palette with a list of at least one color selected by the user; and
- displaying one other color in the third palette.

15. The method of claim 10, further comprising receiving from the searching user a request to apply a previously-created palette to a future search query.

16. The method of claim 10, further comprising:
- defining the bucket manually by segmenting the color spectrum into sections that are visually distinct from one another;
- assigning a bucket color score to each of the buckets, wherein the bucket color score is calculated by extracting lightness, chroma, and hue values of the color associated with the respective bucket, and multiplying the lightness value by the chroma value and by the color volume score.

17. The method of claim 10, further comprising generating a data set which contains a list of at least one color palette ranked by aggregated customer behavior score.

18. The method of claim 10, further comprising receiving input of a search term and a color from the searching user and updating the list to display at least one image which matches the search term and the color.

* * * * *